(12) United States Patent
Gilbert

(10) Patent No.: US 8,485,824 B2
(45) Date of Patent: Jul. 16, 2013

(54) DYNAMIC FORESHORTENING VISUAL AID DEVICE

(76) Inventor: Gerry Wayne Gilbert, Kingsport, TN (US)

( * ) Notice: Subject to any disclaimer, the term of this patent is extended or adjusted under 35 U.S.C. 154(b) by 907 days.

(21) Appl. No.: 12/623,391

(22) Filed: Nov. 21, 2009

(65) Prior Publication Data

US 2011/0123962 A1 May 26, 2011

(51) Int. Cl.
*G09B 11/10* (2006.01)

(52) U.S. Cl.
USPC ............................................................ 434/86

(58) Field of Classification Search
None
See application file for complete search history.

(56) References Cited

U.S. PATENT DOCUMENTS

| | | | |
|---|---|---|---|
| 672,062 A | 4/1901 | Hanstein | |
| 862,625 A * | 8/1907 | Field | 40/414 |
| 951,606 A | 3/1910 | Hanstein | |
| 1,545,296 A * | 7/1925 | Wilson | 446/323 |
| 2,209,791 A * | 7/1940 | Norriss | 446/374 |
| 2,454,899 A | 11/1948 | Twomey | |
| 2,651,116 A | 2/1951 | Vasquez | |
| 2,873,999 A | 2/1959 | Webb | |
| 2,904,930 A * | 9/1959 | Baggott et al. | 446/378 |
| 4,088,315 A * | 5/1978 | Schemmel | 482/4 |
| 4,238,816 A | 12/1980 | Merlo | |
| 4,425,388 A | 1/1984 | Oppenheimer | |
| 4,706,915 A | 11/1987 | Cindric | |
| 5,017,173 A | 5/1991 | Shapero | |
| 5,348,259 A | 9/1994 | Blanco | |
| 5,551,656 A | 9/1996 | De Lozada | |
| 5,741,140 A | 4/1998 | Bristol | |
| D394,669 S | 5/1998 | Becker | |
| 6,471,166 B1 | 10/2002 | Toettcher | |
| 6,598,837 B1 | 7/2003 | Howard | |
| 6,601,326 B1 | 8/2003 | Bublitz | |
| 6,739,936 B1 | 5/2004 | Cotilletta | |
| D515,722 S | 2/2006 | Opolka | |
| 7,377,390 B2 | 5/2008 | Modesto | |
| 2002/0191669 A1 * | 12/2002 | Fan et al. | 374/45 |

OTHER PUBLICATIONS http://www.google.com/search?tbm=pts&q=manikin+with+limbs+and+suspended Jul. 30, 2012.*

* cited by examiner

*Primary Examiner* — Kurt Fernstrom
*Assistant Examiner* — Dolores Collins
(74) *Attorney, Agent, or Firm* — Stephen R. Yoder, Esq.

(57) ABSTRACT

An apparatus for a dynamic foreshortening visual aid. A manikin having articulated limbs and a poseable torso and neck is located in space in fixed dynamic natural and unnatural positions for viewing by a comic book artist. Variable orientation connectors are applied between the manikin and a flexible rod and/or between the flexible rod and a base plate or clamp. The manikin is removeably connected to the flexible rod such that various figures are used with a single flexible rod and base plate. A visual aid having multiple manikins that are viewed interacting with each other is also disclosed.

19 Claims, 5 Drawing Sheets

DYNAMIC FORESHORTENING VISUAL AID DEVICE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to an apparatus for providing a three-dimensional reference image for aspiring artists and art students. More particularly, this invention provides a much needed three-dimensional reference of a human or animal figure in unnatural or non-traditional poses, such as flying or martial arts combat, often required of comic book superheroes.

2. Description of the Related Art

Artists' reference figures of human and animal bodies, also known as manikins, have been in use for many years. The manikins available today are typically bound to a rigid rod at the manikin's center of gravity and attached to a small flat plate for displaying the manikins on a table. The manikin provides the artist with a reference figure of the human body in natural upright or seated positions. This way the developing artist is able to produce remarkably lifelike images without the cost of hiring a live model.

Art schools traditionally use live models or various human or animal manikins for instruction. Comic book characters often assume poses that are unnatural such as flying or mid-air combat. Accordingly, the comic book artist seeking a reference model is forced outside traditional instructional materials where he uses children's action figures as references. Dynamic figure drawing is an essential skill for the comic book artist. Even when the comic book artist obtains a suitable action figure, it is very difficult to imagine that figure, whether human or animal, in the nearly infinite variety of poses which the action hero must inevitably take. The poses of the comic book character often place the figure into deep space showing the figure in radical foreshortening. Such poses cannot be achieved using the existing manikin technology.

In addition to the above concern, the drafting table used by the artist is often an angled table on which it is not suitable to place a traditional manikin stand. The drafting table is also subject to various forces during use, such as the leaning force of the artist's elbows and the forces applied while using artist's instruments. Traditional manikin stands do not rest easily on angled surfaces and do not withstand tipping over under the ordinary forces experienced by the drafting table.

BRIEF SUMMARY OF THE INVENTION

I desired to have a way to view the comic book character in a fixed dynamic position over a length of time while sketching the figure to better absorb the true position and foreshortening details. In accordance with the invention, a support structure places a physical model in easily and precisely changeable poses by locatably mounting the poseable figure onto one end of a semi-rigid member capable of holding its position when caused to bend and being fixable at the other end to the artist's work surface. In this way, the comic book artist can visualize, using a fixed physical model, the numerous unnatural and non-traditional poses taken on by comic book action heroes, thus obtaining accurate dynamic foreshortening effects among other details that make the comic book figures come alive for the reader.

In addition to the above solution to my problem, I have devised a way that multiple figures may be incorporated into the dynamic foreshortening device, thus providing the comic book artist with a way to visualize two or more figures interacting when taking on various poses, such as those seen in mid-air battles of multiple flying figures.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An apparatus for visualizing human and animal figures in dynamic natural and unnatural poses is disclosed. This type of visual aid is ideal for comic book artists who seek dynamic foreshortening visual aids for sketching action packed superhero battles.

Figure 1:
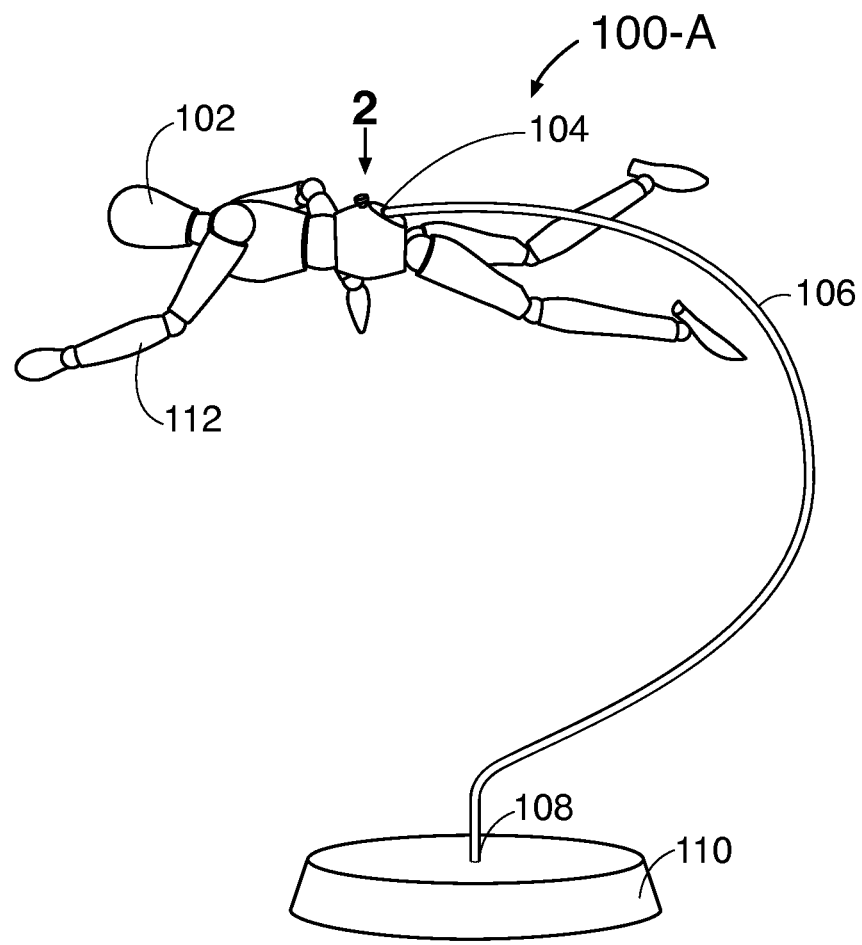
FIG. 1 is a perspective view of one embodiment of a dynamic foreshortening visual aid device.

FIG. 1 illustrates a perspective view of one embodiment of a dynamic foreshortening visual aid device 100-A. A manikin 102 is connected to a rod 106. The manikin 102, as illustrated, is a human figure. In other embodiments the manikin 102 is an animal. The manikin 102 is poseable, that is, the manikin 102, has articulated limbs 112 and a poseable torso and neck. The rod 106 is composed of a flexible material having sufficient elasticity to be bent, twisted, or otherwise deformed into a fixed shape. The rod 106 is fixable into a number of different shapes without fracturing or otherwise failing with use. In one embodiment of the rod 106, the rod 106 is a copper rod. On another embodiment, the rod is made of aluminum. In other embodiments, the rod 106 is solid, small diameter steel or the rod 106 is flexible tubing having mechanical joints.

The rod 106 has a distal end 104 and a proximal end 108. The manikin 102 is connected to the rod 106 at the distal end 104. The orientation of the manikin 102 relative to the rod 106 is fixably variable at the distal end 104. The proximal end 108 is attached to a stand 110. The stand 110 is of a size and configuration to resist tipping of the dynamic foreshortening visual aid device 100 when the manikin 102 is extended a distance away from the center of the stand 110. In other embodiments, the proximal end 108 is attached to a clamp or a mounting plate for securing the dynamic foreshortening visual aid device 100 to the comic book artist's drafting table.

Figure 2:
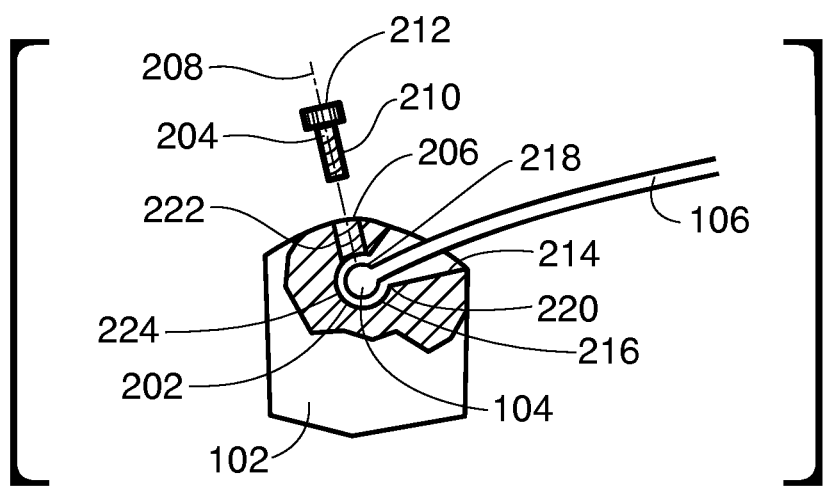
FIG. 2 is an exploded view of one embodiment of a connection between the manikin and the rod of the dynamic foreshortening visual aid device in FIG. 1.

FIG. 2 illustrates an exploded view of one embodiment of the connection between the manikin 102 and the rod 106 of the dynamic foreshortening visual aid device 100-A in FIG. 1. The manikin 102 includes a cavity 202. The cavity 202 is a recessed region having and inside surface 216. The cavity 202 is adjacent an entrance 220. In the illustrated embodiment, the inside surface 216 is smooth and curved. In other embodiments, the inside surface 216 is rectangular or the inside surface 216 is a boundary within the body of the manikin 102 except for the space bounded by the entrance 220.

The distal end 104 has a curved surface 218 that extends beyond the perimeter of the rod 106. The distal end 104 mates with the cavity 202. The cavity 202 is configured to receive and retain the distal end 104. The cavity 202 has a bottom surface 224 on which the distal end 104 contacts when fully seated. The position of the distal end 104 is fixed within the cavity 202 by the operation of a screw 204 that presses the distal end 104 against the curved surface 216 of the cavity 202. In other embodiments, the distal end 104 is fixed within the cavity 202 by another form of stop, such as a shim or a rubber plug.

The distal end 104 is sufficiently larger than the perimeter of the rod 106 such that, when received by to the cavity 202, the manikin 102 has a wide range of motion about the distal end 104. An angled plane 214 is adjacent the cavity 202 surrounding the entrance 220 of the cavity 202. The angled plane 214 increases the range of motion of the manikin 102 about the distal end 104. Also, the angled plane 214 provides a lead-in for the distal end 104. In one embodiment, the distal end 104 and the entrance 220 are sized independently to cause an interference fit when the distal end 104 is inserted into the cavity 202.

The cavity 202 is adjacent to a tunnel 206. The tunnel 206 is cylindrical having a longitudinal axis 208. The longitudinal axis 208 is directed toward a portion of the inside surface 216 of the cavity 202 opposite the tunnel 206. In the illustrated embodiment, the tunnel 206 is cylindrical with a threaded surface 222. In other embodiments, the tunnel 206 is smooth, or the tunnel 206 is rough or otherwise configured to receive a shaft of particular geometric or physical properties. The screw 204 includes a threaded cylinder 210, or shaft, and a head 212. The threaded cylinder 210 has a sufficient length to pass through the tunnel 206 and fill any void between the received distal end 104 and the cavity 202 such that, when tightened against the distal end 104, the distal end 104 is fixed relative to the manikin 102. In the illustrated embodiment, the head 212 is knurled for finger operation. In other embodiments, the head 212 is recessed for operation by a screwdriver, or the head 212 is hex-shaped for operation by a socket driver, or otherwise shaped or configured to be operated in a manner commonly known in the art.

Figure 3:
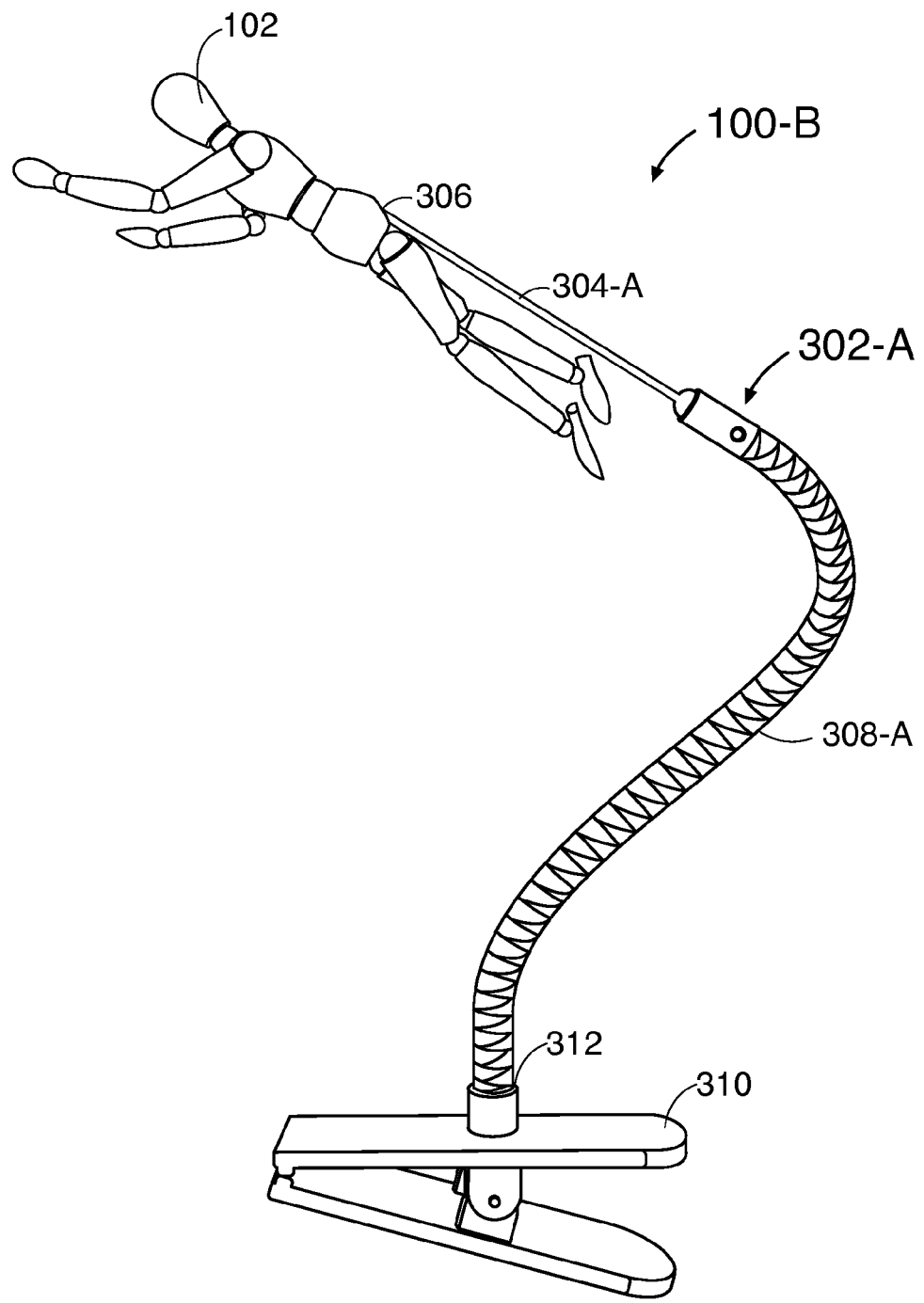
FIG. 3 is a perspective view of another embodiment of a dynamic foreshortening visual aid device.

FIG. 3 illustrates a perspective view of another embodiment of a dynamic foreshortening visual aid device 100-B. In this embodiment, the manikin 102 is attached to a beam 304-A at a fixed point 306. The beam 304-A is connected at the end opposite of the fixed point 306 to a flexible tube 308-A by a connector 302-A. In the illustrated embodiment, the flexible tubing 308-A is attached to a clamp 310. The flexible tubing 308-A is mechanically hinged in a way commonly known in the industry. In other embodiments, a flexible rod is used. Such a rod being flexible, yet sufficiently plastic to hold a given configuration. The clamp 310 provides for the removable attachment of the dynamic foreshortening visual aid device 100-B to the edge of a table or other solid surface. In this way, the comic book artist attaches the dynamic foreshortening visual aid device 100-B nearby his work on his drafting table in a secure manner to resist bumping or gravitational pull. Also, the fixed dynamic foreshortening visual aid device 100-B provides for simple one-handed manipulation of the orientation and pose of the manikin 102. In other embodiments, the clamp 310 is replaced by a stand 110 or a mounting plate.

Figure 4:
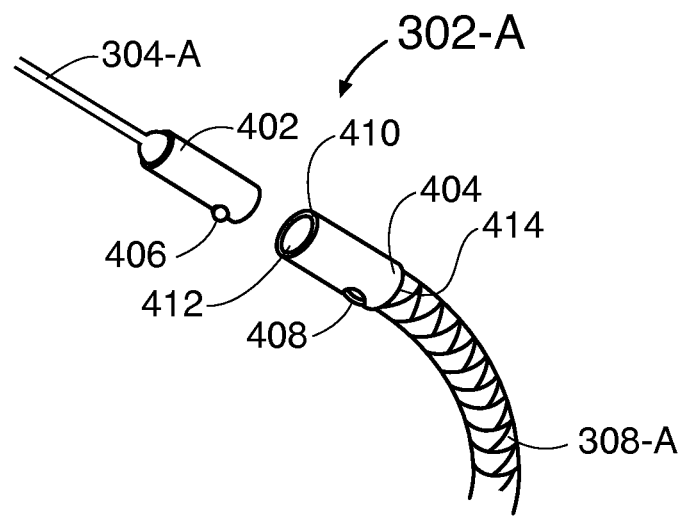
FIG. 4 is an exploded view of one embodiment of a connector between the beam and the flexible tubing of the dynamic foreshortening visual aid device in FIG. 3.

FIG. 4 illustrates an exploded view of one embodiment of a connector 302-A between the beam 304-A and the flexible tubing 308-A of the dynamic foreshortening visual aid device 100-B in FIG. 3. The connector 302-A consists of a plug 402 and a socket 404. The plug 402 is attached to the end of the beam 304-A opposite the fixed point 306. The plug 402 includes a dimple 406. The dimple 406 is a rounded protrusion on the side of the plug 402 extending beyond the perimeter of the plug 402. The dimple 406 is resiliently retractable into the side of the plug 402 such that the dimple 406 is located mostly or completely within the plug 402.

The socket 404 is cylindrical having a wall 410 around the perimeter to create a well 412. The socket 404 is attached to the tip 414 of the flexible tubing 308-A by a crimp or a weld or other attachment means whereby the socket 404 is securely and permanently attached to the flexible tubing 308-A. The well 412 is dimensioned and configured to receive the plug 402. There is a window 408 on the side of the socket 404 passing through the wall 410. The window 408 is sized and positioned to receive the dimple 406 when the plug 402 is seated into the well 412. The dimple 406 is rounded such that the dimple 406 retracts as the dimple 408 contacts the wall 412 when the plug 402 enters the well 412.

Figure 5:
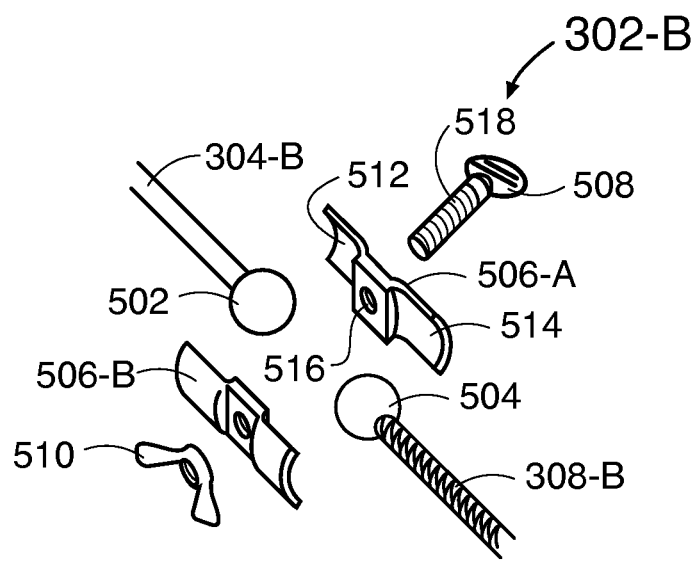
FIG. 5 is an exploded view of another embodiment of a connector between the beam and the flexible tubing of the dynamic foreshortening visual aid device in FIG. 3.

FIG. 5 illustrates an exploded view of another embodiment of a connector 302-B between the beam 304-B and the flexible tubing 308-B of the dynamic foreshortening visual aid device 100-B in FIG. 3. In this embodiment, the beam 304 terminates with a first bearing 502 and the flexible tubing 308-B terminates with a second bearing 504. The first bearing 502 has a rounded surface that extends beyond the perimeter of the beam 304-B. The second bearing 504 also has a rounded surface that extends beyond the perimeter of the flexible tubing 308-B. As each bearing 502, 504 extends beyond the perimeter of the corresponding elongated member 304-B, 308-B, increased movement of each member, the beam 304-B and the flexible tubing 308-B, is achieved.

The first bearing 502 and the second bearing 504 are held a fixed distance apart by two retainers 506-A, 506-B. Each retainer 506-A, 506-B includes a first pocket 512 and a second pocket 514. The first pocket 512 is configured to mate with a portion of the first bearing 502. The second pocket 514 is configured to mate with a portion of the second bearing 504. When assembled, the two retainers 506-A, 506-B are oriented such that the pockets 512, 514 of one retainer 506-A are facing the pockets 512, 514 of the other retainer 506-B.

On each retainer 506-A, 506-B there is a thru-hole 516. The thru-hole 516 is centrally located between the first pocket 512, or concave surface, and the second pocket 514, or concave surface. The connector 302-B further includes a bolt 508 and a nut 510. The bolt 508 has a threaded shaft 518. The threaded shaft 518 is inserted into the thru-hole 516 of each of the retainers 506-A, 506-B. The nut 510 is secured to the end of the threaded shaft 518 such that the two retainers 506-A, 506-B are pressed together against the two bearings 502, 504. When the retainers 506-A, 506-B are pressed together in the connector 302-B, the first bearing 502 and the second bearing 504 are fixed into a predetermined orientation. In order to reposition the bearings 502, 504, the nut 510 is loosened. In the illustrated embodiment, the nut 510 has finger tabs for hand assembly. In other embodiments, the nut 510 is hex-shaped to accommodate the use of a wrench, or the nut 510 is knurled for finger tightening.

Figure 6:
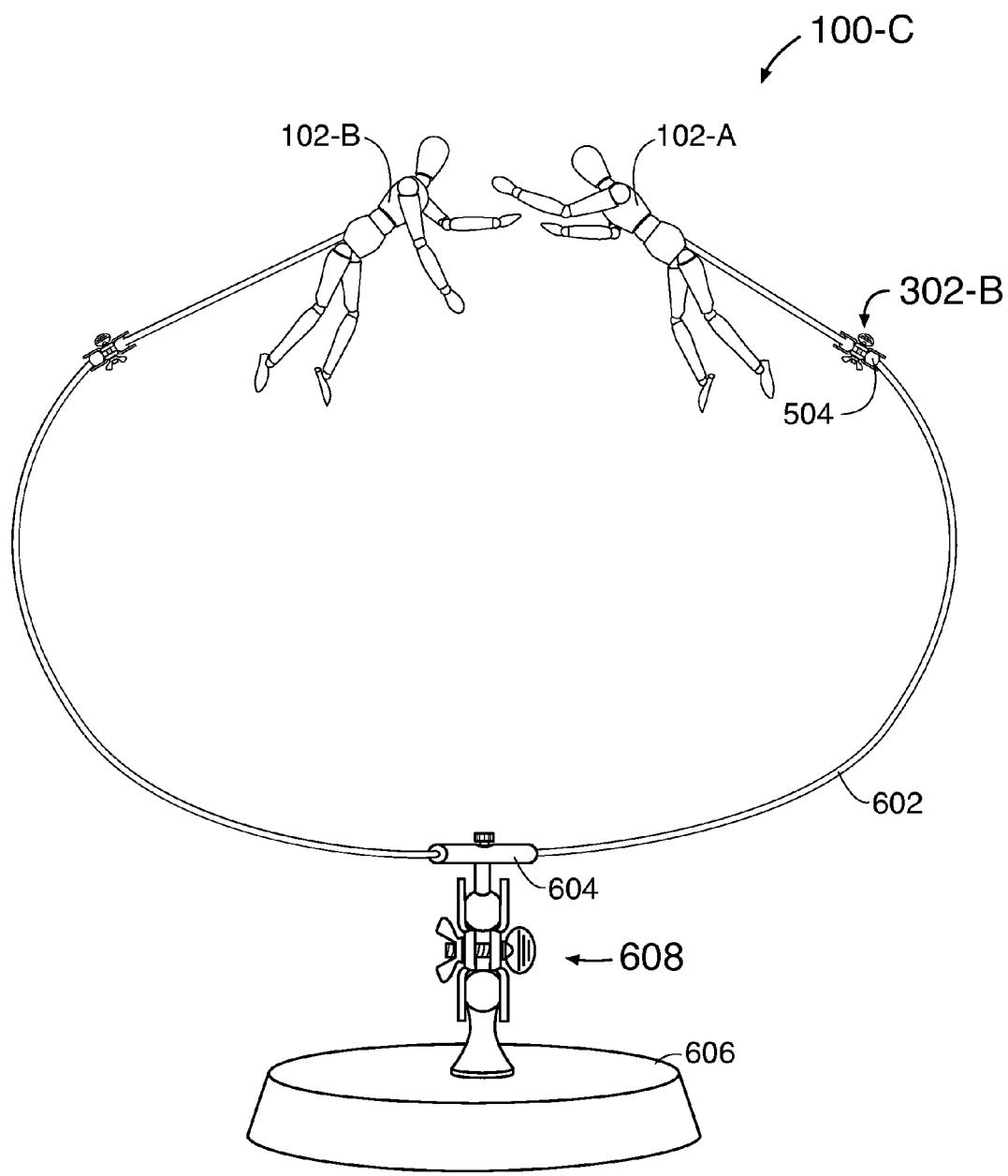
FIG. 6 is a perspective view of one embodiment of a dynamic foreshortening visual aid device having two independently poseable manikins.

FIG. 6 illustrates a perspective view of one embodiment of a dynamic foreshortening visual aid device 100-C having two independently poseable manikins 102-A, 102-B. In the illustrated embodiment, the manikins 102-A, 102-B are connected to the two ends of a bar 602. The bar 602 is composed of a flexible material having sufficient plasticity to be bent, twisted, or otherwise deformed into a fixed shape. The bar 602 passes through a collar 604. The two ends of the bar 602, one on each side of the collar 604, are attached to two bearings, a third bearing 610 and a fourth bearing 612. The connector 302-B in FIG. 5 is shown as the rotatable attachment means connecting the beams 304-B to the ends of the bar 602. In other embodiments, the connector 302-A in FIG. 4 is used, or the manikins 102 are connected to the bar 602 at their respective cavities 202 as shown in FIG. 2. The bar 602 is fixably oriented by a collar 604. The collar 604 is attached to a base 606 by a pivot 608 operating on the same principles as the connector 302-B in FIG. 5.

Figure 7:
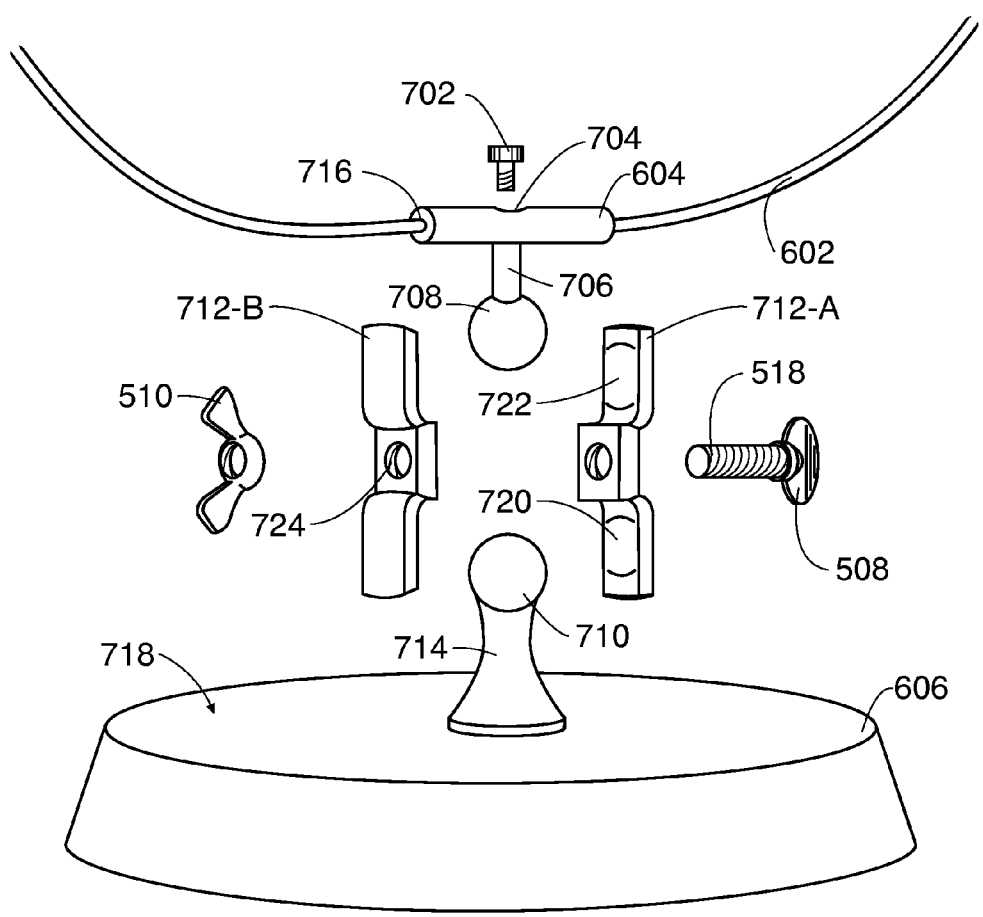
FIG. 7 is an exploded view of one embodiment of the adjustable connections between the base and the rod tube of the dynamic foreshortening visual aid device in FIG. 6.

FIG. 7 illustrates an exploded view of one embodiment of the adjustable connections between the base 606 and the bar 602 of the dynamic foreshortening visual aid device 100-C in FIG. 6. The collar 604 is a cylinder having an orifice 716 located centrally along the longitudinal axis of the collar 604. In other embodiments, the collar 604 is a geometric shape other than a cylinder having a passage or orifice 716 passing through the body of the object. The orifice 716 is dimensioned and configured such that the bar 602 passes through the collar 604. One end of the bar 602 is located on each end of the collar 604. The collar 604 has an aperture 704. The aperture 704, as illustrated, is threaded. The aperture 704 is directed radially toward the orifice 716.

A thumb screw 702 having a threaded portion with length enough to pass into the orifice 716 is tightened against the bar 602 to fix the orientation of the bar 602 within the collar 604. The thumb screw 702 presses against the bar 602 as the thumb screw 702 is tightened. When the thumb screw 702 presses against the bar 602, the bar 602 is forced against the surface of the orifice 716. Accordingly, the bar 602 is fixed in a given orientation.

A first protrusion 706 extends radially away from the collar 604. The first protrusion 706 terminates with a fifth bearing 708. A second protrusion 714 extends from the base 606 perpendicular to the planar surface 718 of the base 606. The second protrusion 714 terminates with a sixth bearing 710. Two plates 712-A, 712-B, each having a first concave surface 720 and a second concave surface 722, are located on opposite sides of the fifth bearing 708 and the sixth bearing 710. The first concave surface 720 of each plate 712-A, 712-B mates with a portion of the sixth bearing 710. The second concave surface 722 of each plate 712-A, 712-B mates with a portion of the fifth bearing 708.

The two plates 712-A, 712-B are secured against the fifth and sixth bearings 708, 710 in the same manner as the retainers 506-A, 506-B are secured to the first and second bearings 502, 504 in FIG. 5. That is, each plate 712-A, 712-B has an aperture 724 through which the threaded shaft 518 of the bolt 508 passes. The two plates 712-A, 712-B are secured about the bearings 708, 710 by a nut 510.

It will be understood that various modifications may be made to the embodiments disclosed herein. Therefore, the above description should not be construed as limiting, but merely as exemplification of the various embodiments. Those skilled in the art will envision other modifications within the scope and spirit of the claims appended hereto.

What is claimed is:

1. An apparatus comprising:
   a manikin, said manikin having a plurality of articulated limbs;
   a rod, said rod attached to said manikin, said rod having a spherical end;
   a beam, said beam being deformable by hand, said beam having a first distal end, said first distal end holding a fixed location in space, said first distal end having a spherical shape;
   at least two retainers, each one of said at least two retainers having at least two concave surfaces, one of said at least two concave surfaces dimensioned and configured to mate with said spherical end, another of said at least two concave surfaces dimensioned and configured to mate with said distal end, each of said at least two retainers having an opening;
   a bolt, said bolt dimensioned and configured to pass through said opening of each of said at least two retainers, said bolt having a head, said head having a circumference larger than said opening; and
   a nut, said nut dimensioned and configured to thread onto said bolt, said at least two retainers located between said head and said nut, whereby said beam is releaseably and rotatably attached to said rod.

2. The apparatus of claim 1 further including a collar, said collar having a longitudinal axis, said collar having an outer wall, said collar having an opening along said longitudinal axis, said opening dimensioned and configured to received said beam, said beam having an second distal end, said second distal end located opposite said first distal end with respect to said collar, said second distal end holding a fixed location in space, said second distal end having a spherical shape, said collar having a passage, said passage angled with respect to said longitudinal axis, said passage dimensioned and configured to receive a thumb screw, said thumb screw having a threaded shaft, said threaded shaft passing through said outer wall, whereby said threaded shaft may contact said beam, fixing said beam within said collar.

3. The apparatus of claim 2 further including a first protrusion, said first protrusion extending away from said longitudinal axis of said collar, said protrusion terminating in a first knob, said first knob having a rounded surface.

4. The apparatus of claim 3 further including a base, said base having a top surface, said base having a second protrusion protruding away from said top surface, said second protrusion terminating in a second knob, said second knob having a rounded surface, said base rotatably attached to said collar by a releasable connector.

5. The apparatus of claim 1 further including a base, said base attached to said first proximal end of said beam, said base being a size and shape to deter the base from tipping due to an imbalance of weight.

6. The apparatus of claim 1 further including a recess, said recess being bounded by a chamfer, said recess having a bottom surface sufficient distance from said chamfer that a sphere contacting said bottom surface is located below said chamfer and entirely within said recess.

7. The apparatus of claim 6 further including a tunnel, said tunnel adjacent said recess, said tunnel extending into said recess.

8. The apparatus of claim 7 further including a stop, said stop dimensioned and configured to be received by said tunnel, said stop having a size and configuration such that said stop, passing through said tunnel, extends into said recess.

9. The apparatus of claim 8 wherein said stop is a screw, said screw having a threaded shaft, said threaded shaft dimensioned and configured to be threaded into said tunnel.

10. The apparatus of claim 1 further including a socket, said socket attached to said distal end of said beam, said socket being a cylinder, said cylinder having an outer wall.

11. An apparatus comprising:
a manikin, said manikin having a plurality of articulated limbs;
a recess, said recess being bounded by a chamfer, said recess having a bottom surface sufficient distance from said chamfer that a sphere contacting said bottom surface is located
below said chamfer and entirely within said recess; and
a tunnel, said tunnel adjacent said recess, said tunnel extending into said recess.
a stop, said stop dimensioned and configured to be received by said tunnel, said stop having a size and configuration such that said stop, passing through said tunnel, extends into said recess,
wherein said stop is a screw, said screw having a threaded shaft, said threaded shaft dimensioned and configured to be threaded into said tunnel.

12. The apparatus of claim 11 further including a rod, said rod having a distal end, said distal end being enlarged with respect to said rod, said distal end being spherical, said distal end dimensioned and configured to be received by said recess.

13. The apparatus of claim 12 further including a bearing end, said bearing end attached to said rod, said bearing end opposite said distal end, said bearing end being spherical, said bearing end dimensioned and configured to be secured by a retainer.

14. The apparatus of claim 11 further including a beam, said beam being deformable by hand, said beam having a distal end, said distal end holding a fixed location in space, said beam having a first proximal end.

15. The apparatus of claim 14 further including a base, said base attached to said first proximal end of said beam, said base being a size and shape to deter the base from tipping due to an imbalance of weight.

16. An apparatus comprising: a beam, said beam being deformable by hand, said beam having a distal end, said distal end holding a fixed location in space, said beam having a first proximal end;
a manikin attached to said beam, moveable about said distal end, said manikin having
a plurality of articulated limbs;
a socket, said socket attached to said distal end of said beam, said socket being a cylinder, said cylinder having an outer wall;
a window, said window passing through said outer wall, said window dimensioned and configured to receive a dimple from within said socket;
a base, said base attached to said first proximal end of said beam, said base being a size and shape to deter the base from tipping due to an imbalance of weight; and a rod, said rod having a plug end, said plug end having a cylindrical body, said plug end having a dimple, said dimple being a rounded protrusion extending radially away from said cylindrical body, said dimple being resiliently retractable into said cylindrical body, said plug end dimensioned and configured to be inserted into said socket.

17. The apparatus of claim 16 further including:
a recess, said recess being bounded by a chamfer, said recess having a bottom surface sufficient distance from said chamfer that a sphere contacting said bottom surface is located below said chamfer and entirely within said recess;
a tunnel, said tunnel adjacent said recess, said tunnel extending into said recess; and
a stop, said stop dimensioned and configured to be received by said tunnel, said stop having a size and configuration such that said stop, passing through said tunnel, extends into said recess.

18. The apparatus of claim 16 further including a manikin attached to said beam, moveable about said distal end, said manikin having a plurality of articulated limbs.

19. The apparatus of claim 16 further including a bearing end, said bearing end attached to said rod, said bearing end opposite said distal end, said bearing end being spherical, said bearing end dimensioned and configured to be secured by a retainer.

* * * * *